May 13, 1958 E. MAY 2,834,249
MECHANISM FOR PROJECTING FILMS OF DIFFERENT WIDTHS
Filed Aug. 30, 1955 9 Sheets-Sheet 1
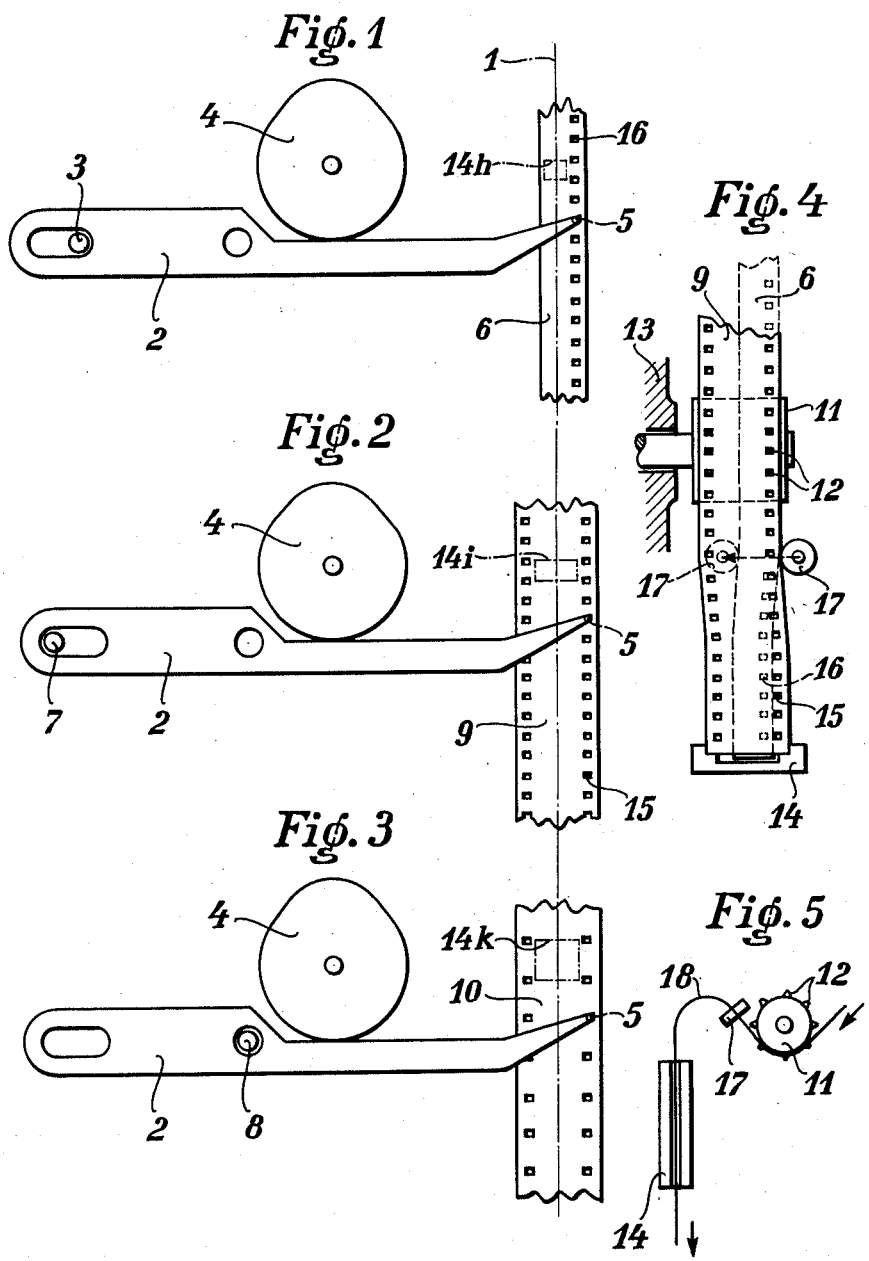
INVENTOR.
Erwin May May 13, 1958          E. MAY          2,834,249
MECHANISM FOR PROJECTING FILMS OF DIFFERENT WIDTHS
Filed Aug. 30, 1955          9 Sheets-Sheet 2
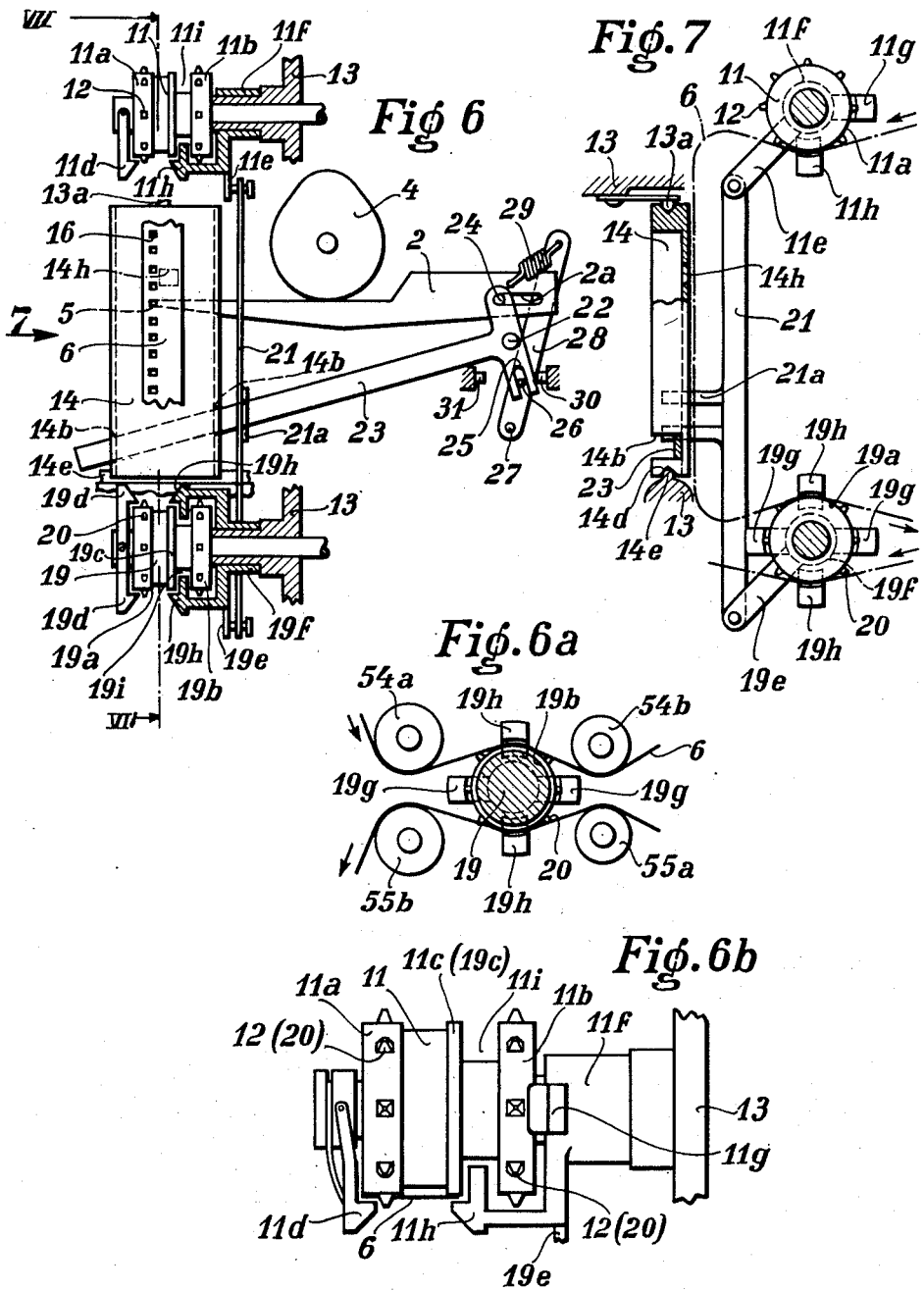

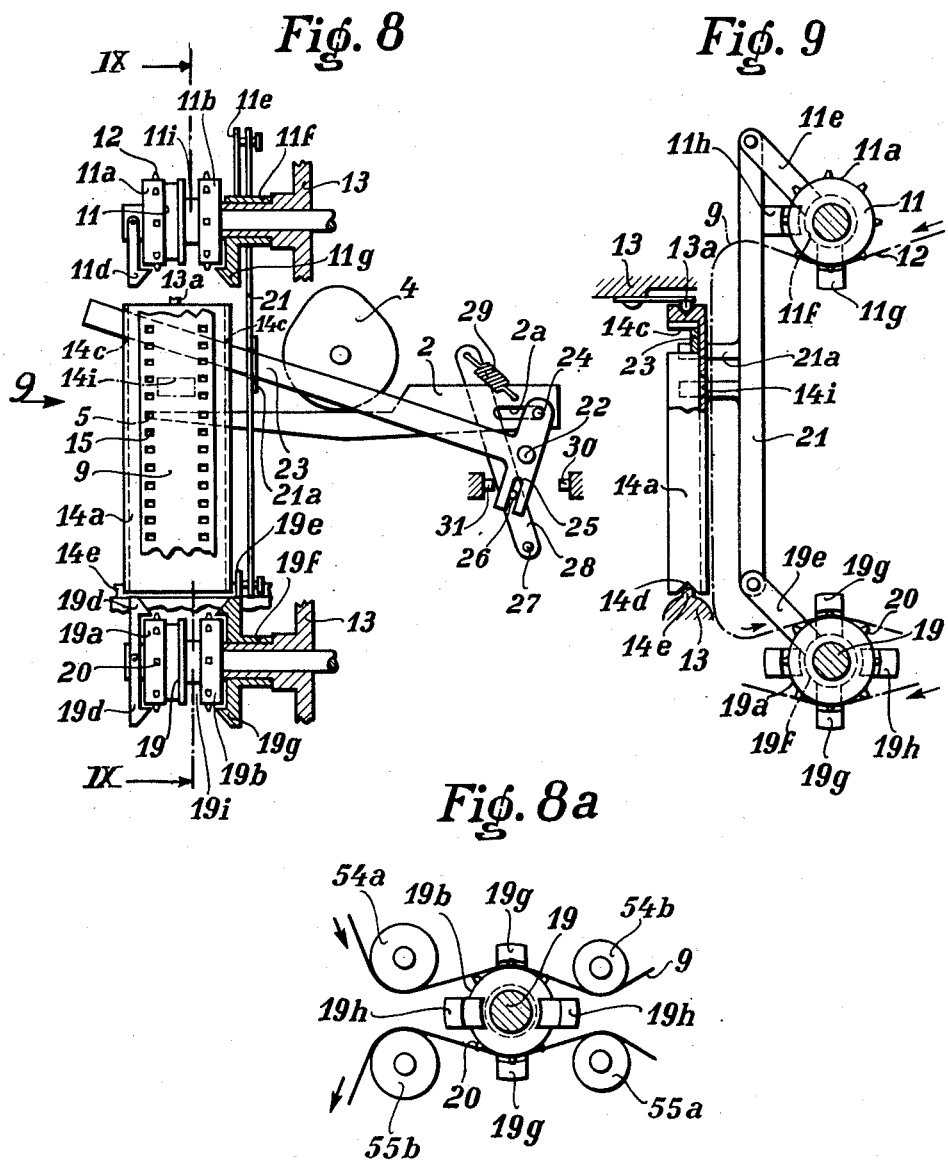

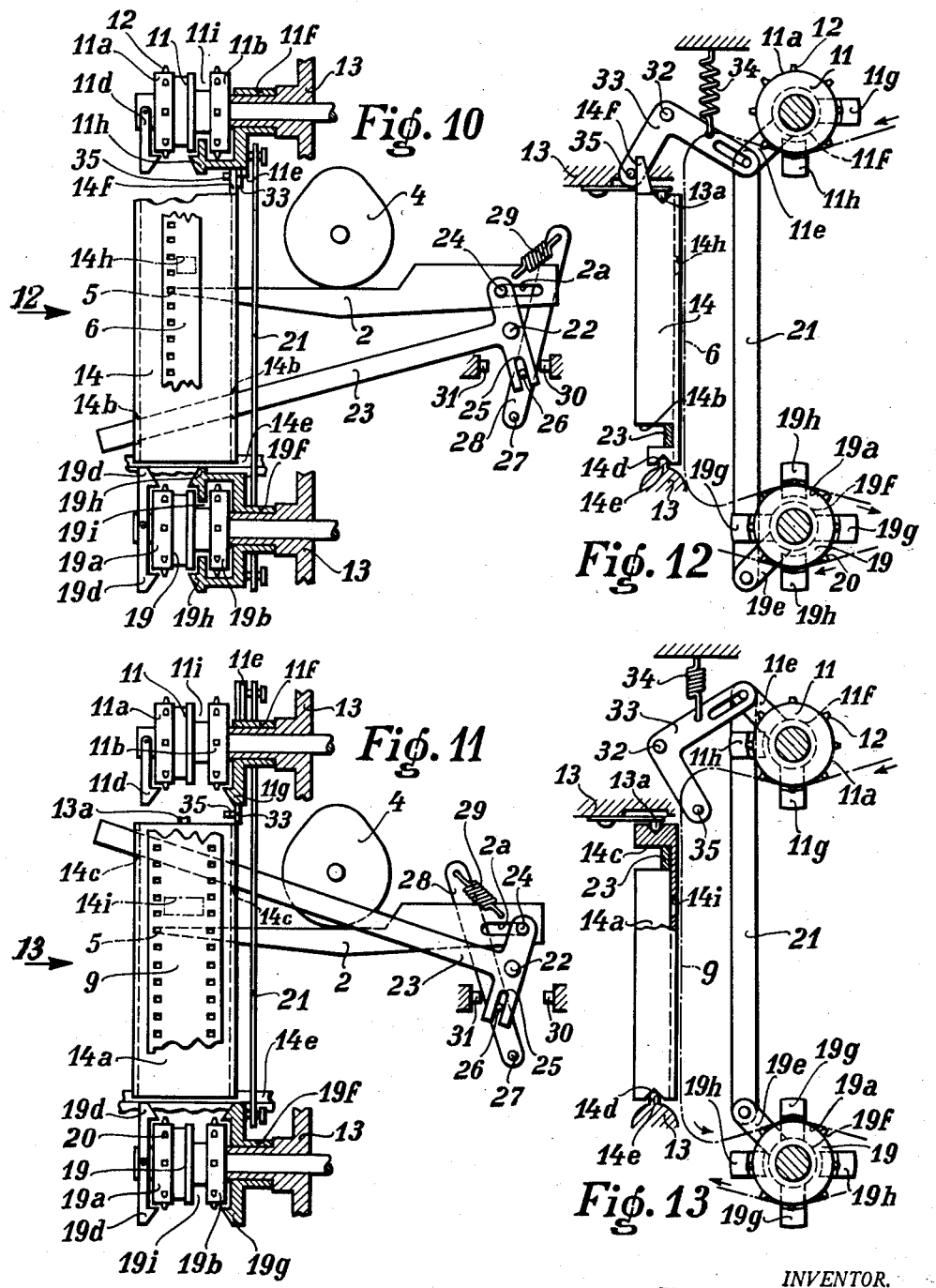

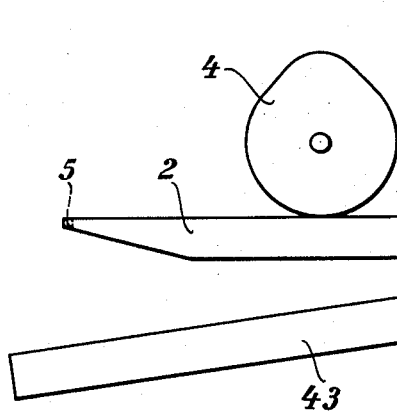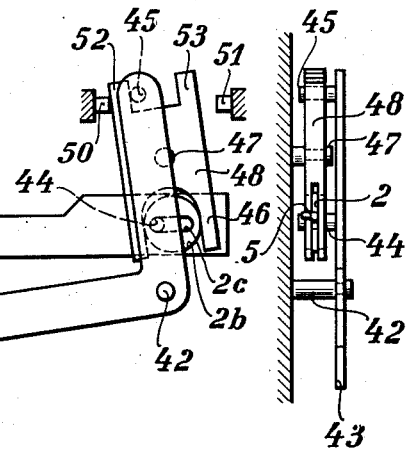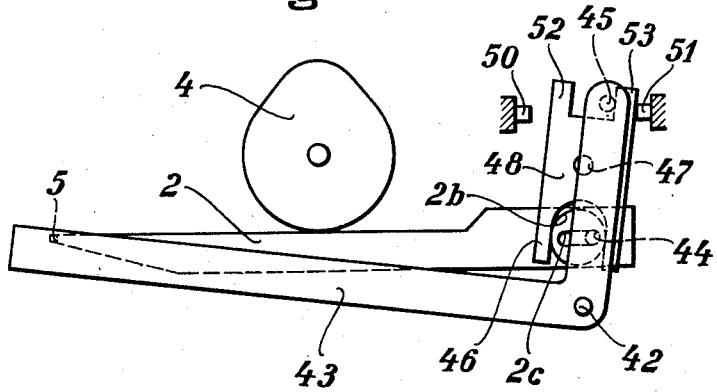

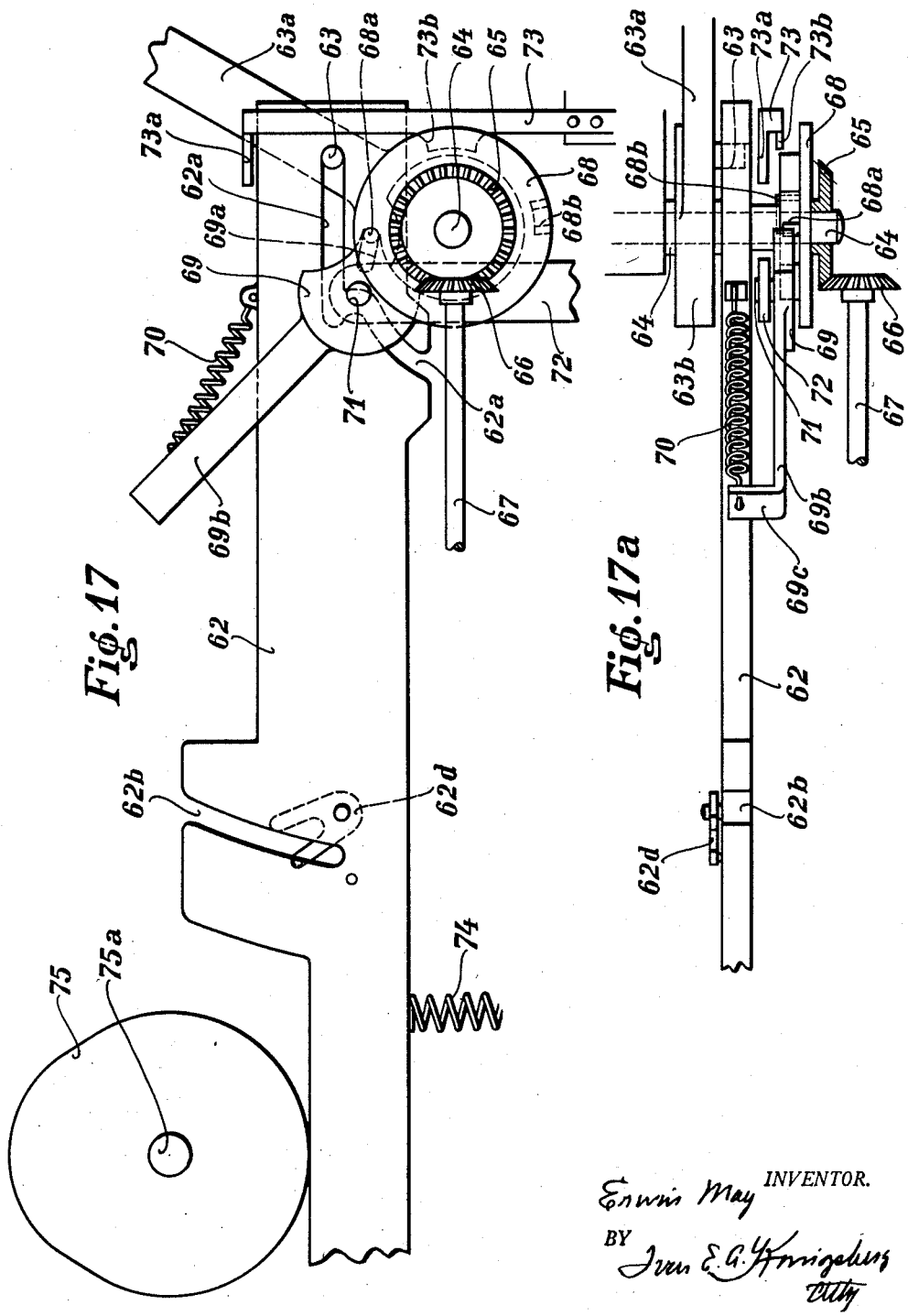

May 13, 1958 E. MAY 2,834,249
MECHANISM FOR PROJECTING FILMS OF DIFFERENT WIDTHS
Filed Aug. 30, 1955 9 Sheets-Sheet 7

INVENTOR.
Erwin May
BY
Jinn E. A. Konigsberg

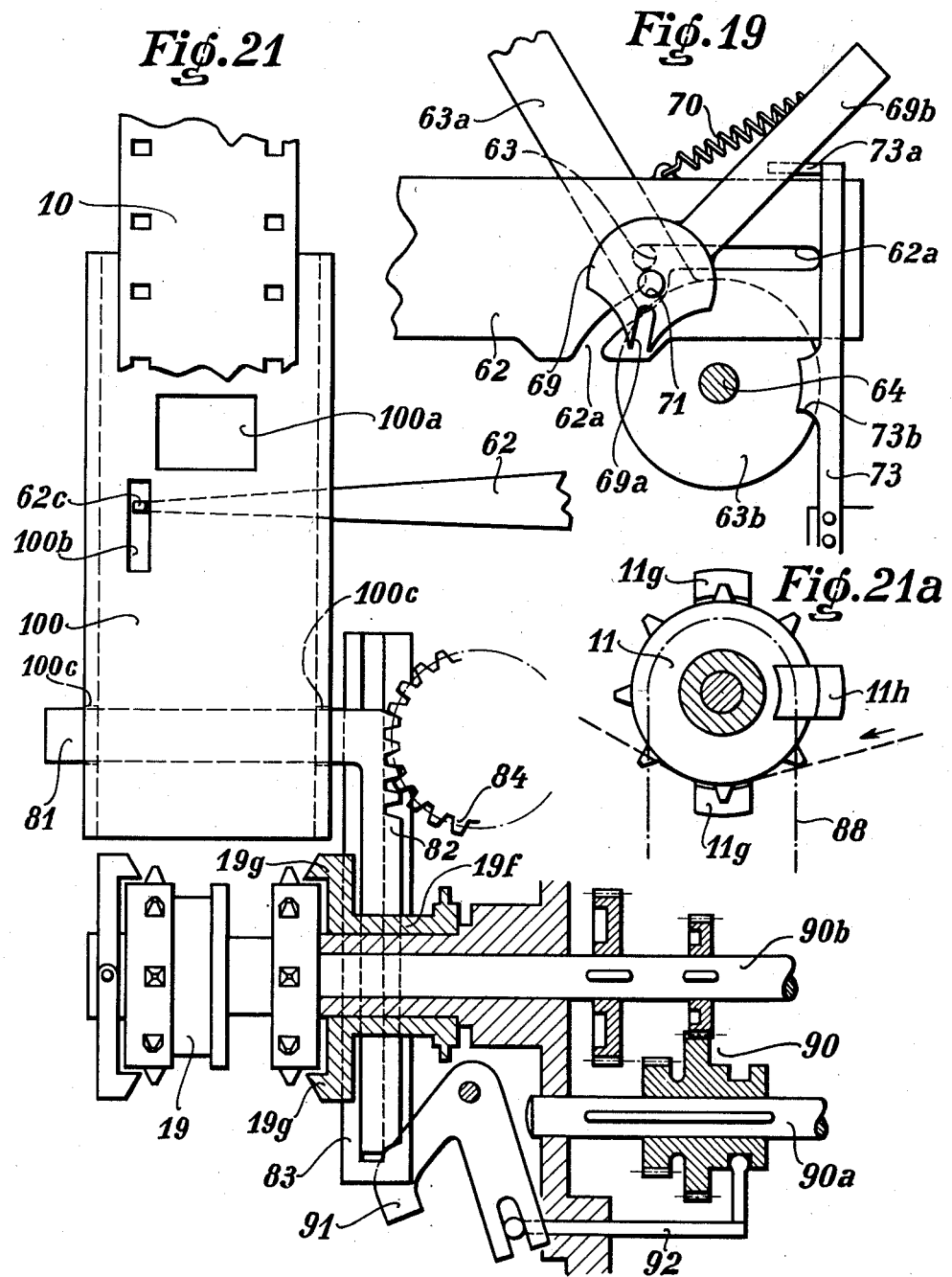

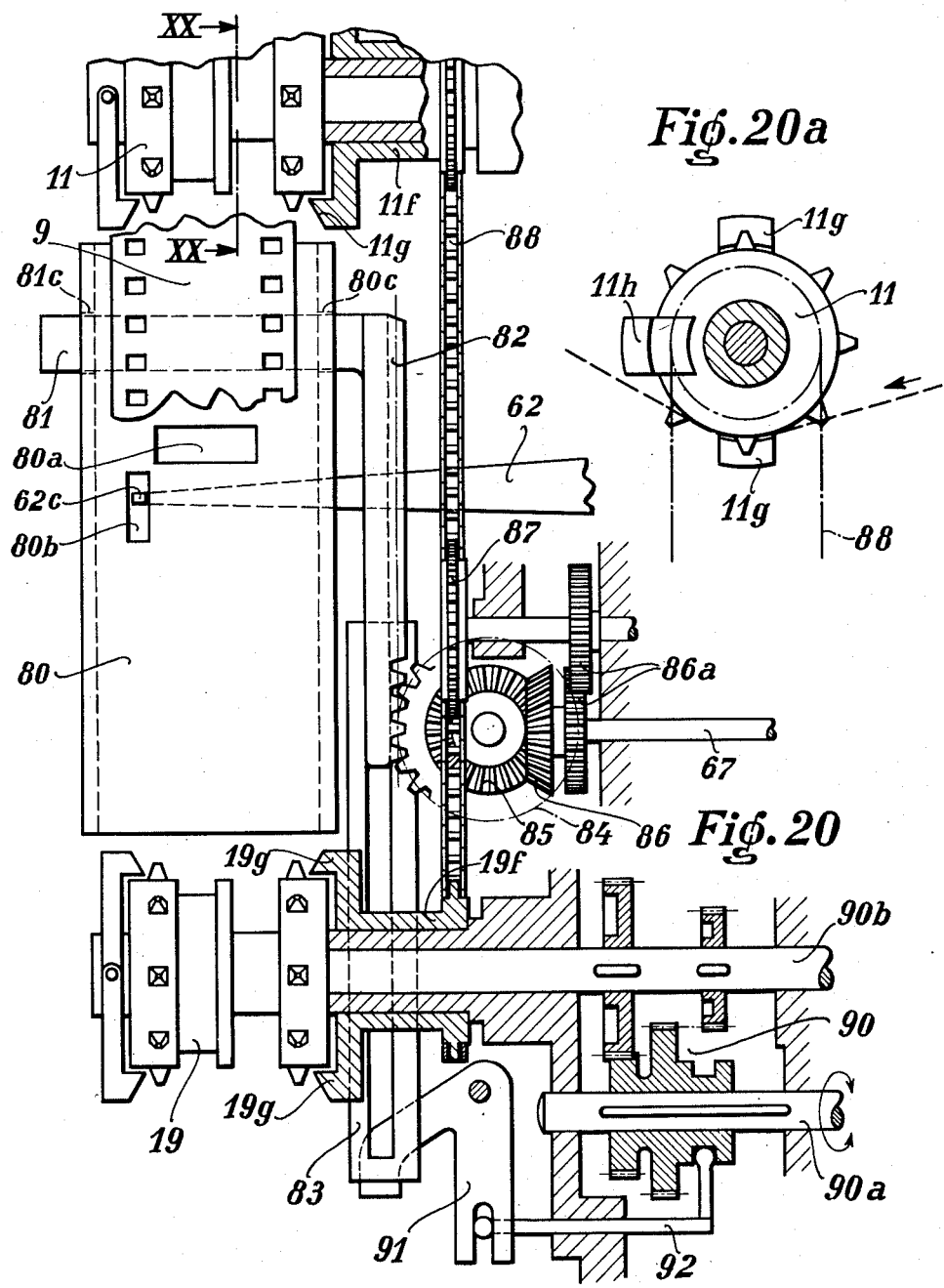

United States Patent Office 2,834,249
Patented May 13, 1958

2,834,249

MECHANISM FOR PROJECTING FILMS OF DIFFERENT WIDTHS

Erwin May, Wetzlar (Lahn), Germany, assignor to Ernst Leitz, G. m. b. H., a corporation of Germany Application August 30, 1955, Serial No. 531,381

Claims priority, application Germany September 2, 1954

14 Claims. (Cl. 88—18.4)

This invention relates to improvements in mechanisms which are used on projectors for projecting films of different widths. The object of the invention is to provide means for automatically changing the movable film guiding arms on the film transport rollers by means of suitable coupling mechanisms interposed between said guiding arms and the exchangeable film guide which guides the film past the picture window. The coupling mechanisms include means for changing the location of the film claw pivot so that this claw may move the film in the usual manner irrespective of the width of the film. Also the film guiding arms which cooperate with the film transport rollers are automatically changed to suit the film.

Prior devices for projecting films of different widths sometimes include complicated technical means for effecting the change from one film to another of different width and such technical means require the manipulations of several mechanisms so that, particularly if the projection is operated by an amateur, trouble in the operations of the machine may occur.

The different embodiments of this invention include the common feature that the medial axis of the film picture coincides with the optical axis of the projection apparatus whereby otherwise needed changes in the illuminating means, the objective, and other changes, are avoided. In stereofilms the medial plane coincides with the dividing plane between the two pictures.

The changes in the film operating means occur automatically when the films and the film guides are changed. The pivot of the film claw is also changed so that, for example, the use of different cams for operating the film claw when the films are changed is no longer necessary. The film transport rollers are wide enough to accommodate the widest film and so constructed that the film rests upon the roller only with the edges of the film strip, and whereby damage to the film is avoided.

One object of the invention is therefore to provide the film transport rollers with movable film guiding arms to suit the widths of different films and provide means for coupling the arms with exchangeable film guides attached to the projector so that by merely changing the film guides on the projector, the guiding arms on the transport rollers are automatically operated to suit the films to be projected, and whereby also the location of the pivot for the film claw is automatically changed. By manually changing the location of the pivot of the film claw, the latter is automatically adapted to move a different film. The usual film claw operation is not changed when a film is changed.

Other objects and advantages of the invention will be pointed out hereinafter and will be best understood by a reading of the following specification and claims with reference to the accompanying drawings in which—

Figs. 1-3 illustrate diagrammatically different sized films and the corresponding different locations of the film claw pivot.

Figs. 4 and 5 are diagrammatic outline views illustrating the arrangements of the film transport roller and the film guides.

Fig. 6 is a view showing the film claw in position for moving an 8 mm. film with transport rollers above and below the film guide with the picture window, parts being in section.

Fig. 6a is a partial sectional view of the lower transport roller shown in Fig. 6.

Fig. 6b is an outside view of a film transport roller with film guiding means.

Fig. 7 is a sectional view taken on the line VII—VII in Fig. 6.

Figure 18:
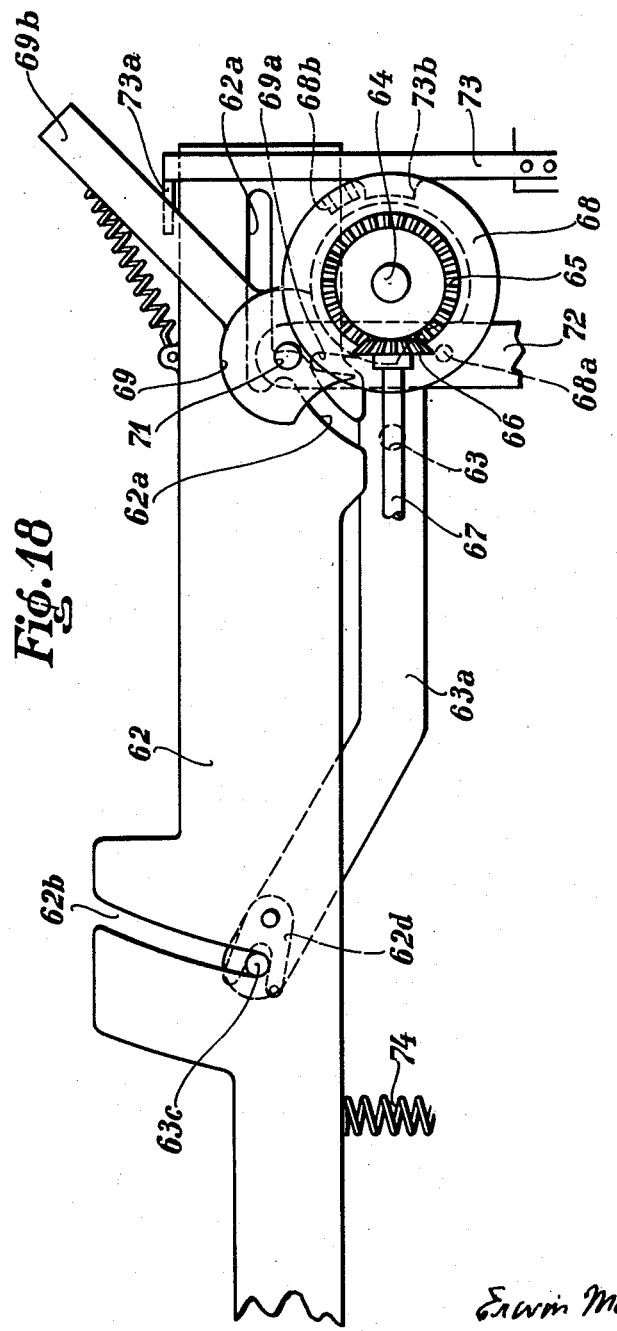

Figs. 8, 8a and 9 are views similar to Figs. 6, 6a and 7 but show the mechanism arranged to operate upon a double 8 mm. film.

Fig. 9 is a sectional view on the line IX—IX in Fig. 8.

Figs. 10-13 illustrate a modification from the foregoing illustrated embodiments of the invention.

Figs. 14-16 illustrate still another modification.

Figs. 17-21a illustrate mechanisms adapted for the projection of 8 mm., 16 mm. and stereo films.

Fig. 1 shows an 8 mm. film 6 having perforations 16 at one edge and adapted to be moved by the film claw 2 which is provided with a tooth 5 engaging the perforations. The film claw has apertures so it can be manually adjusted to oscillate about a pivot which is differently located for the different films. A cam disk 4 guides the film claw which oscillates about the pivot 3. The picture window is indicated at 14h in Fig. 1.

Fig. 2 shows a double 8 mm. film with perforations 15 at both edges of the film and with the film claw 2, which is movable about another pivot 7. The picture window in Fig. 2 is shown at 14i.

Fig. 3 shows a 16 mm. film 10 being moved past the picture window 14k. The film claw 2 is then oscillated about the third pivot 8.

The line marked 1 indicates the optical axis of the projection apparatus and this axis coincides with the medial axis of the film. The same cam 4 guides the film claw 2 irrespective of the width of the film.

Figs. 4 and 5 illustrate diagrammatically the films 6 and 9 with perforations 16 and 15 respectively, moving over a transport roller 11 provided with film engaging teeth 12. The film forming the usual loop 18, Fig. 5, after passing between side guide rollers 17 to the film guide 14. The film transport rollers are mounted in the projector housing 13, but is not axially slidable therein. The projection apparatus is not shown. The rollers 17 are digrammatic representations of film guiding means.

Figs. 6, 6a, 6b and 7 show the positions of the several elements when an 8 mm. film is to be projected. In this embodiment of the invention, the film passes over one transport roller 11 to the film guide 14 and out over a second lower transport roller 19. The film guide 14 has the picture window 14h. The two transport rollers 11 and 19 are alike. The reference characters 11 refer to the upper roller, the characters 19 to the lower roller.

Each roller 11, 19, has teeth 12, 20, for transporting the films. If an 8 mm. film is projected, the edges of such film run on the outer surfaces 11a, 19a, on the one side (outside) and upon circular flanges 11c, 19c, on the other side (inside), Fig. 6b. A wider film runs with its edges upon the roller surfaces 11a, 19a, and upon the roller surfaces 11b, 19b, adjacent the housing 13. Spring pressed guides 11d, 19d, are provided on the outside to prevent the films from slipping off the rollers. The picture window 14h is in axial alinement with the optical axis of the projector.

Each transport roller is provided with film guiding arms for guiding the inner edge of the film. The arms are automatically positioned to guide a film of a given width when a corresponding film guide 14, 14a, with picture window is placed in position on the projector.

Figs. 6–13 show that for each upper transport roller 11 guiding arms 11g and 11h are provided, the outer edge of the film being guided by the arms 11d described above. The arms 11g and 11h extend radially from hub 11f on the housing and are so arranged that when the hub is rotated the arms will also rotate with relation to the transport roller 11.

In Figs. 6, 6b, 7, 10 and 12, the guide arms 11h guide the inner edge of an 8 mm. film on the upper roller 11. Guide arms 19h perform the same function on the lower rollers 19, as best seen in Figs. 6 and 10.

The lower transport roller 19 is also provided with rotatable film guiding arms, which in this instance are four in number. Two diametrically opposed arms 19h guide the inner edge of an 8 mm. film as shown in Figs. 6, 6a, 7, 10 and 12. The two other diametrically opposed arms 19g guide the inner edge of a 16 mm. film as seen in Figs. 8, 8a, 9, 11 and 13. The arms 19h and 19g extend radially from a hub 19f which is rotatably mounted on the housing like the first named hub 11f.

The two rotatable hubs 11f and 19f each has an arm 11e, 19e. The arms are connected by a link 21 with a forked recess at 21a, Figs. 7 and 9. The two hubs 11f and 19f respectively are rotated to shift the guide arms to guide either a narrow or a wide film.

When an 8 mm. film is to be projected, an exchangeable film guide 14 with picture window 14h is placed in position on the projector in the housing 13 thereof as seen in Figs. 6 and 7. The guide is held at the top by a spring pressed detent 13a and at the bottom by means of a groove 14d which rests upon a ledge 14e of the housing 13. The guide 14 also has a recess 14b to receive a coupling lever 23. The latter is fixedly pivoted at 22 and is formed with three arms. When an 8 mm. film is to be projected the coupling arm 23 is moved by the operator into the recess 14b in the guide 14 and also enters the recess 21a in the link 21. In this position a second arm of the lever 23 has a pin 24 held in the left end of a slot 2a in the film claw 2 by means of a dead center spring 29. A third arm of the lever 23 ends in a fork 25 which rides on a pin 26 in another lever 28 which is fixedly pivoted at 27. The lever 28 moves between fixed stops 30, 31.

Thus, when the film guide 14 is inserted in place upon the projector and the coupling lever 23 is moved down into the guide recess 14b, the guide arms 11h and 19h are automatically positioned to guide an 8 mm. film through the movements of the coupling lever 23, the link 21 and the arms 11e, 19e of the rotatable hubs 11f, 19f. The several parts then have the positions shown in Figs. 6 and 7.

When a wider film is to be projected another film guide 14a is inserted in the projector as shown in Figs. 8 and 9. The guide 14a has a recess 14c at the upper end to receive the coupling lever 23 which is now moved by the operator into the upper position as shown in Fig. 8, and whereby link 21 is also moved upwards, the recess 21a of the link being engaged by the coupling lever 23. This in turn causes a rotation of the guide arms on the transport rollers so that the wider film is guided by said arms as shown in Figs. 8, 8a and 9.

The three armed lever 23 has now been moved so that the lever 28 is on the left hand side of the pivot 27 and the film claw now oscillates about the pivot 24 which is at the right hand end of the slot 2a. The pivot 24 in Fig. 8 corresponds to the pivot 7 in Fig. 2.

By operation of the mechanisms as shown in Figs. 6, 6a and 7, the operation of a narrow film is provided for. The mechanism is automatically changed to operate a wider film by merely inserting the wider film guide 14a in position on the projector and moving the coupling lever into the recess 14c. The film guiding arms on the transport rollers are also automatically operated to guide the wider film, the coupling bar 23 providing for the change in operations.

In the modifications illustrated in Figs. 10–13, the link 21 has no recess 21a. The film guide 14 is modified and directly causes the link 21 to rotate the film guide arms for guiding a narrow film. In Figs. 10 and 12, the film guide 14 holds the coupling lever 23 in the lower position as in Fig. 6. However, the film guide in Fig. 12 has at its upper end a tooth 14f which engages a right-angled lever 33 to rotate the arm 11e downwardly and thereby positions the film guiding arm 11h to guide a narrow film on the transport roller. The lever 33 is pivoted at 32 and has a pin 35 to be engaged by the tooth 14f. A spring 34 holds the lever in pivotal contact with the arm 11e.

When another film guide 14a is inserted on the projector the spring 34 actuates the lever 33 to pull the arms 11e, 19e and the link 21 upwards to rotate the film guiding arms clockwise for guiding a wider film, Figs. 11 and 13. The coupling lever 23 is moved upwards into the recess 14c of the guide 14a and the film claw 2 engages at the right hand end of the slot 2a, whereas the pivot 24 is at the left hand end of the slot in Fig. 10. The slot 2a being longer than the movement of the pivot 24, the film claw 2 is moved to the left by the dead center spring 29 for operating a double 8 mm. film.

A further modification is illustrated in Figs. 14–16. The coupling lever 43 is pivoted at 42 and has an upright arm with a pin 45 which moves between prongs 52 and 53 in the upper end of a lever 48 pivoted at 47. The lower end of the lever 48 is bifurcated as at 46. The film claw 2 carries a disk 2b with a slot 2c. The pin 44 in the film claw forms a pivot for the film claw. The lever 48 swings on its pivot 47 between adjustable stops 50 and 51, whereby the pin 44 is moved to the other end of the slot 2c when the coupling lever 43 is moved into the upper position, Fig. 15.

Fig. 14 shows the positions of the parts when an 8 mm. film is projected. The projection of a double 8 mm. film is shown in Fig. 15. The coupling lever 43 acts as the coupling lever 23 in the Figs. 6–9, when a cross bar 21 with a recess 21a is provided for changing the film side guiding elements, and is coupled with the recesses 14b and 14c respectively.

In Figs. 6 and 7, the film guide 14 with the recess 14b determines the lower position of the coupling lever 23 for automatic actuation of the guide arms to guide an 8 mm. film over the transport rollers. The same operation is shown in Figs. 10 and 11, except that the modified film guide 14 in this example causes the automatic operation of the guide arms by means of the right-angled lever 33. The examples in Figs. 8 and 9, and in Figs. 11 and 13, are alike in that the film guide 14a has the upper recess 14c for positioning the coupling lever 23 to move a 16 mm. film. But whereas the coupling lever 23 actuates the link 21 in Figs. 8 and 9, the link 21b is actuated by the spring 34 in Figs. 11 and 13.

When an 8 mm. film is to be projected, the film claw 2 oscillates about the pivot 24 corresponding to the pivot 3 in Fig. 1. When a double 8 mm. film is projected, the film claw oscillates about the same pivot 24 but in the position corresponding to the position 7 in Fig. 2.

Figs. 6a and 8a show film guiding rollers 54a, 54b and 55a, 55b. These rollers are shown conventionally and form no part of the invention.

The foregoing Figs. 6–16 show embodiments of the invention which are adapted only for the projection of 8 mm. and double 8 mm. films. In these embodiments the pivot position of the film claw and the lateral movement of the claw remains the same, except that Fig. 3 shows the arrangement for the projection of a 16 mm. film. In these examples the position of the film claw remains as shown in Fig. 2, but the stepwise movement is doubled. The position of the guide arms on the rollers 11 and 19 remains as in Figs. 8 and 11, but the speed of rotation of the rollers 11 and 19, and of all other moving parts of the projection mechanism must also be doubled.

The following embodiments of the invention illustrate a projection mechanism which is adapted for the projection of 8 mm., double 8 mm., 8 mm. stereo and 16 mm. films.

Fig. 17 is a view in elevation with parts broken away showing a mechanism embodying the invention when a double 8 mm. or an 8 mm. stereofilm is to be projected.

Fig. 17a is a plan view of the parts shown in Fig. 17.

Fig. 18 is a view in elevation the same as Fig. 17, but shows the parts in position after having been changed to operate on a 16 mm. film.

Fig. 19 is a detail view of parts shown in Fig. 17 after said parts have been changed to operate.

The film claw 62 has a tooth 62c for engagement with the film perforations Fig. 20. In the pivot end of the claw, Fig. 17, it is provided with a guiding slot 62a which has a lateral straight portion and a downwardly extending S-portion with an open end. Adjacent the claw operating cam 75 on the shaft 75a, the film claw has a second open ended slot 62b. A pivot pin 63 for the film claw 62 is arranged to slide in the slot 62a in the film claw and is carried in an arm 63a which extends from a disk 63b which rotates about the shaft 64, Fig. 17a.

The shaft 64 carries a bevel gear 65 which meshes with a smaller bevel gear 66 on a shaft 67. The shaft 64 carries also a drive wheel 68 which in turn carries a drive pin 68a which engages the slot 69a in a driven disk 69. The arrangement corresponds to the so called Maltese drive in which, when the drive wheel 68 is rotated, the pin 68a therein enters the slot 69a and thereby drives the driven disk 69, and moves the disk 69 one step clockwise in Fig. 17—from the position shown in Fig. 17 to the position shown in Fig. 19.

The disk 69 has an arm 69b which has its free end connected to the film claw 62 by a dead center spring 70. The disk 69 rotates about a shaft 71 which is fixedly supported in an arm 72. In order to insure a smooth change in the mechanism from one film to another a flat safety spring 73 is mounted on the projection housing and the free end of the spring terminates in a finger 73a which, when the mechanism is changed from the position shown in Fig. 19 to the position shown in Fig. 18, grips the pivot end of the film claw 62 and prevents lifting movement of the film claw. The spring 73 is also formed with a lip 73b which lies in the path of rotation of a projection 68b secured on the drive wheel 68. The arm 63a, broken away in Figs. 17, 17a and 19 carries in its outer end a pin 63c which is adapted to engage the slot 62b in the film claw 62, as shown in Fig. 18.

The operation of the mechanism shown in Figs. 17–19 is as follows:

The several parts have the positions shown in Figs. 17 and 17a for the projection of double 8 mm. or 8 mm. stereofilms in which the pictures are arranged in two adjacent rows. The pin 63 is the operating pivot of the film claw 62 and is held in the right end of the slot 62a by the dead center spring 70. An expansion spring 74 presses the film claw 62 against the cam 75 which, by each rotation causes the film to be advanced one picture length.

If the mechanism is to be adjusted for the projection of an 8 mm. film then the smaller bevel gear 66 is rotated to cause the larger bevel gear 65 to be rotated about sixty degrees. The rotation of the smaller bevel gear 66 will be explained later on in connection with Figs. 20 and 21.

When the larger bevel gear 65 is rotated, the disk 63b with its arm 63a on which the two pins 63 and 63c are supported is also rotated about sixty degrees so that the pin 63 is moved to the left in the slot 62a and the film claw 62 will be slightly lifted.

The drive wheel 68 is also rotated about sixty degrees so that the pin 68a thereon enters the slot 69a and thereby rotates the driven disk 69 and moves the arm 69b clockwise in the opposite direction. This brings the spring 70 into the position shown in Fig. 19 and the film claw 62 is moved toward the right until stopped by the pivot pin 63 at the left end of the lateral slot 62a.

This additional shifting of the film claw to the right is necessary in order to position the claw tooth 62c in the correct position for moving an 8 mm. film. Fig. 19 shows the operating position of the film claw with the elements lying in front of the drive disk 69 omitted.

When the mechanism is adjusted for the projection of 16 mm. film, Fig. 18, the larger bevel gear is rotated still further about sixty degrees together with the drive disk 68 and the disk 63b. The driven disk 69 and the spring 70 remain in their positions. At the beginning of this further rotation the projection 68b on the drive disk 68 engages the lip 73b of the flat spring 73 and thereby presses the spring against the film claw so that the finger 73a at the end of the spring can engage the pivot end of the film claw and prevent a lifting movement of the claw.

When the disk 63b is rotated, the pivot pin 63 in the arm 63a enters the S-formed portion of the slot, 62a, and passes out of the open end of the slot. Just before the pivot pin 63 leaves the slot 62a the pin 63c in the free end of the same arm 63a, enters the slot 62b in the film claw, Fig. 17. The pin 63c is held in the slot 62b by a resilient, forked piece 62d in the lower end of the film claw slot 62b as a safety measure. The pin 63c then serves as a pivot for the film claw when a 16 mm. film is projected. Just before these changes are completed, the projection 68b slides off of the lip 73b on the spring 73 whereby the latter returns to its normal position and the finger 73a again releases the film claw 62. Fig. 18 shows the parts in the positions for projecting a 16 mm. film.

Fig. 20 is a front view of the film guiding means with the film transport rollers and connections, parts being in section and parts broken away.

Fig. 20a is a sectional view of the upper transport roller taken on the line XX—XX in Fig. 20.

Fig. 21 is a front view of parts shown in Fig. 20 with parts in section and parts broken away.

Fig. 21a is a detail view of the lower transport roller shown in Fig. 21.

Referring first to Fig. 20, the film guide is shown at 80 with the picture window 80a and an opening 80b for the film claw tooth 62c. The film guide has side recesses 80c for the insertion of a coupling lever 81. The latter carries a toothed rack 82 which moves in a guide 83 at the bottom thereof, the rack 82 meshes with a gear 84. A bevel gear 85 is carried on the same shaft as the gear 84. The bevel gear 85 is in mesh with another bevel gear 86 on the end of the aforesaid shaft, 67. The shaft 67 drives a chain gear 87 by means of gearing 86a. The chain gear 87 drives a chain 88 which operates the above described film transport rollers 11 and 19 as shown. These transport rollers are provided with teeth which are spaced to correspond with the spacing of the perforations in a 16 mm. film. The transport rollers in Fig. 20 are like the other above described transport rollers and require no further description except that the changing of the transport rollers' guide arms in Fig. 20 is done by the chain drive 87, 88, whereby the film side guide arms are turned ninety degrees, that is, they are 180 degrees rotatable. Because of this the upper roller 11 has two guide arms 11g, Fig. 20a, whereas in the foregoing examples the upper roller has only one guide arm 11g.

When a 16 mm. film is to be projected, the speed of the film must be doubled and for this reason a speed change mechanism 90 is provided which, by means of an angular lever 91 and a link 92 is operated to shift speed when the coupling lever 81 is placed in the recess 80c for projection of a 16 mm. film.

The driving shaft 90a of the speed changing mechanism 90 is directly connected with the motor of the projection apparatus, the motor not being shown. The driven shaft 90b actuates all the other members of the projection mechanism except steering cam 75 which regulates the stroke of the film claw.

Fig. 20a shows the film being guided by the guide arm 11g on the upper transport roller 11.

Figs. 21 and 21a show the arrangement for the projection of 16 mm. film. In Fig. 21 the film guide 100 has the picture window 100a and the opening 100b for the tooth 62c of the film claw. The recesses 100c for the reception of the coupling lever 81 are located near the bottom of the film guide 100. Otherwise the parts in Fig. 21 correspond to like parts in Fig. 20. Fig. 21a shows the details of the upper transport rollers 11 in Fig. 21.

For the sake of a clear understanding of the invention the following points should be noted:

The disclosures in Figs. 6–16 provide mechanisms for the projection of an 8 mm. or a double 8 mm. film with the exception shown in Fig. 3 where the projection of a 16 mm. film is disclosed with a corresponding change in length of stroke of the film claw and the operating speed must be doubled. The shiftable pivot support 24 for the film claw 2 is in these embodiments carried by the coupling lever 23.

If, however, all types of film are to be provided for, the mechanisms illustrated (Figs. 17–21a) may be used as noted in connection with the description of the different views.

Thus in one group of mechanisms, Figs. 6 and 8, the change from an 8 mm. film to a double 8 mm. and vice versa is accomplished by the insertion of a suitable film guide, 14 or 14a, with recesses 14b, 14c, whereby the coupling lever may be manually positioned to effect a corresponding automatic change in the guide arms on the transport rollers.

The second group of mechanisms, Figs. 17, 20 and 21, provide for projection of films from 16 mm. to stereofilms and the guide arms in the transport rollers are automatically changed by the manual insertion of the coupling lever 81 in the correct recesses in the film guide to operate the chain drive 88. Also, from the coupling lever 81 and by means of toothed rack 82 and gearing 84, 85 and 86, the shaft 67 is rotated to actuate the mechanisms for shifting the film claw 62 and the claw pivot 63. In the mechanisms illustrated in Figs. 17–18, the pivots 63 and 63c for the film claw 62 are not carried by the coupling lever 81, but are carried by the film claw pivot lever 63a.

I claim:

1. In a film transporting and film guiding mechanism for use in a film projection apparatus, an exchangeable film guide for the passage of the film therethrough for projection of the film; means for detachably securing said film guide to said apparatus; a picture window in the film guide; a pivotally supported and laterally movable film claw engaging the film to move it past said picture window; a coupling lever; means in said film guide for receiving said coupling lever manually inserted in said guide in a predetermined position depending upon the spacing of the perforations in the film to be projected and means interposed between and operatively connected to said coupling lever and the said film claw for changing the location of the operating pivot of the film claw to position the film claw for engagement with the perforations in the film to be projected and means for operating said film claw.

2. A mechanism according to claim 1 including a plurality of exchangeable film guides, each of said film guides having means for receiving the said coupling lever manually inserted in a predetermined operative position in the guide depending upon the width of the film to be projected.

3. A mechanism according to claim 2 wherein the extent of the operations of the film claw is dependent upon the spacing of the perforations in the film and the extent of the adjustment of the said guide arms are dependent upon the width of the film to be projected.

4. A mechanism according to claim 2 wherein the said film claw and the said guide arms are simultaneously moved into predetermined positions in response to the width of the film to be projected.

5. A mechanism according to claim 1 including film transport rollers for guiding the film towards and away from said film guide, movable film guide arms supported in operative relation to each of said transport rollers for guiding the film thereon and means operatively connected to and between said film guide arms and the said coupling lever for adjusting said guide arms to guide a film of a selected width upon the said transport rollers.

6. A mechanism according to claim 5 wherein the said film transport rollers are as wide as the widest film to be projected and the said guide arms are adjustable to guide films of different widths for transport upon the said rollers.

7. A mechanism as defined in claim 5 wherein the said guide arms are adjusted to guide a film transported by said rollers to an extent in accord with the width of the film to be projected.

8. A film transporting and film guiding mechanism for use on film projection apparatus comprising an exchangeable film guide for the film to be projected, means for detachably securing said film guide to said apparatus, a picture window in said film guide, a film claw engaging the film to move the film past the picture window, film transport rollers supported on the apparatus for transporting the film passing through said film guide, guide arms movably supported on the apparatus in operative relation to said film transport rollers to guide the film thereon as it is being transported by the rollers, a coupling lever pivoted on the apparatus, means in said film guide for receiving said coupling lever placed manually in a predetermined operative position in said film guide to accord with the spacing of the perforations in the film to be projected, means operatively connecting said coupling lever with the said film claw and other means operatively connecting the coupling lever with said transport rollers guide arms for positioning, respectively, the said film claw to move a selected film past said film window and for positioning said movable guide arms to guide said selected film on the said rollers when said coupling lever is positioned in the film guide as aforesaid.

9. A film transporting and film guiding mechanism for use in a film projection apparatus comprising an exchangeable film guide for the film to be projected, a picture window in said film guide, a laterally and vertically movable pivoted film claw engaging the film to move the same within the said guide past the picture window therein, a coupling lever, means in said film guide for receiving the coupling lever manually inserted therein at a predetermined location to accord with the spacing of the perforations in the film to be projected, means operatively connecting said coupling lever and the said film claw to actuate the latter in response to the width of the film to be projected and means independent of said film guide for guiding the film through the said apparatus irrespective of the width of the film.

10. A mechanism according to claim 9 including movable operative pivot means for the said film claw and mechanisms operatively connecting said movable pivot means with the said film claw whereby to change the position of the said film claw operative pivot means in response to the spacing of the perforations in the film to be projected.

11. A mechanism for transporting and guiding the film in a film projection apparatus, the film having perforations spaced a predetermined distance apart within the ranges of films described comprising, in combination, an exchangeable film guide having a picture window of a size to fit the dimensions of the pictures on the film to be projected; means for mounting the film guide in operative position on said apparatus; a vertically and laterally adjustable film claw on said apparatus for moving the film within the film guide past the picture window therein; means for adjusting the position and the film moving operation of the said film claw in dependence upon the spacing of the perforations in the film to be projected; a coupling lever; means in said film guide for manually positioning therein said coupling lever in response to the spacing of the perforations in the film to be projected; and means operatively connecting said coupling lever with the said film claw for operatively adjusting the position and operation of the film claw to move a film having a width and perforation pitch within the range of films aforesaid past the picture window in the film guide for projection of the film.

12. The combination according to claim 11 including film transport rollers for transporting the film through said apparatus before and after projection of the film, movable guide arms on each of said transport rollers operatively connected therewith for guiding the film thereon and means interposed between and operatively connecting said film claw operating and adjusting means and said guide arms for adjusting the latter to guide a film of a predetermined width on said transport rollers.

13. The combination according to claim 12 including a speed changing mechanism for changing the speed of rotation of the said film transport rollers.

14. In a film transporting and film guiding mechanism for use in a film projection apparatus for projecting, selectively, 8 mm. films, double 8 mm. films, 8 mm. stereofilms and 16 mm. films, comprising, in combination, film transport rollers, movable film side guides thereon, an interchangeable film guide for guiding a selected film between said rollers, a picture window in said film guide, a pivotally supported film claw engaging the perforations in a film to move the film, a film claw pivot lever, pivot pins in the latter adapted to engage said film claw to provide pivots therefor for the movements thereof, a coupling lever, means in said film guide for supporting the coupling lever manually inserted therein in a predetermined position according to the perforation pitch of the film to be projected, means interposed between said coupling lever and said movable film side guides on said transport rollers for positioning said side guides to guide a film on said rollers, means interposed between said coupling lever and said film claw pivot lever to move the latter so as to provide pivotal support for the film claw for moving a selected film past the picture window and a driven change speed mechanism operatively connected with said film transport rollers to drive the same.

References Cited in the file of this patent

UNITED STATES PATENTS

| | | |
|---|---|---|
| 2,355,939 | Wurger | Aug. 15, 1944 |
| 2,528,840 | Mitchell | Nov. 7, 1950 |